May 19, 1970     G. B. FOSTER     3,512,402

NON-CONTACTING VIBRATION ANALYZER

Filed May 17, 1966     2 Sheets-Sheet 1

INVENTOR
GEORGE B. FOSTER

BY Le Blanc & Shur

ATTORNEY

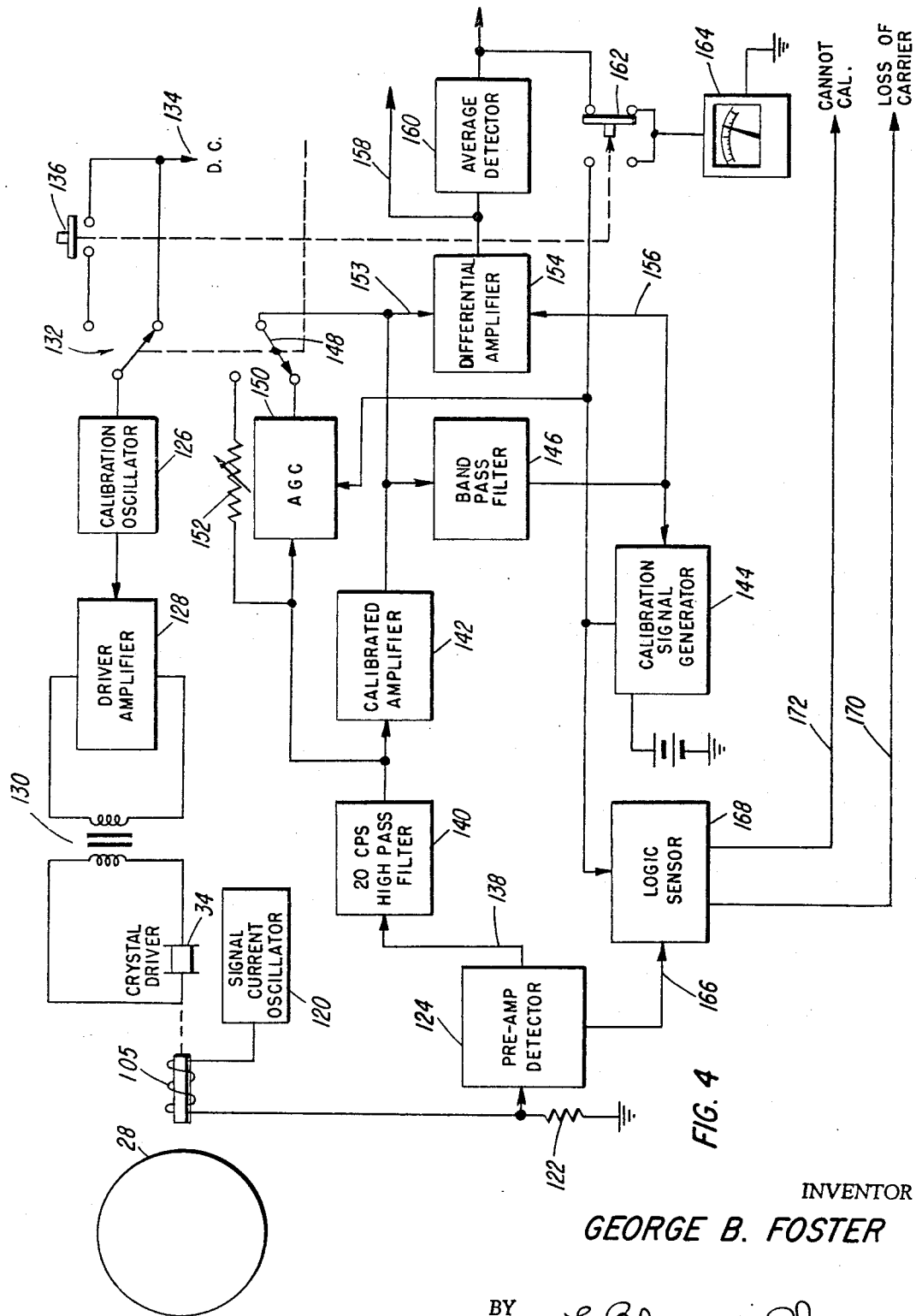

United States Patent Office 3,512,402
Patented May 19, 1970

3,512,402
NON-CONTACTING VIBRATION ANALYZER
George B. Foster, Worthington, Ohio, assignor to Reliance Electric & Engineering Co., Cleveland, Ohio, a corporation of Ohio
Filed May 17, 1966, Ser. No. 553,263
Int. Cl. G01h 11/00
U.S. Cl. 73—71.4                            26 Claims

ABSTRACT OF THE DISCLOSURE

A non-contact apparatus for measuring vibration of an electrically-conducting object including a coil positioned in spaced proximity to the object and coupled to an electromechanical apparatus for imparting a known vibration to the coil relative to the object. An oscillator provides an electrical signal through the coil. The impedance of the coil is a function of the instantaneous distance from the coil to the object; therefore the electrical signal is modulated as a function of the instantaneous distance. Suitable circuitry is connected to the coil to convert the modulated signal into a measurement of the vibration being monitored.

---

The present invention relates to the sensing, monitoring, measuring and analysis of vibration and more particularly relates to devices of the foregoing type which require no contact with the vibrating element but which may be inserted directly in the bearing housing of a rotating machine or in other adverse environments previously inaccessible to practical vibration measurement. The present invention is especially useful for measuring vibration of ferrous or non-ferrous metal shafts or structures surrounded by moving lubricants (in the case of high speed machines) or other liquids, such as might be present in chemical manufacturing processes.

Considerable effort has been expended over a long period of time to develop transducers and associated equipment for translating mechanical vibrations into measurable electrical signals. The earliest of these devices employed were contact sensors responsive to the velocity of a vibrating member. They generally comprised a first element mounted seismically in a transducer body, which body was directly affixed to the vibrating member whose motion was to be determined. In such systems, an electrical parameter of the sensing member was adapted to be modified in response to the vibration, whereby a time varying electrical signal related to the vibration velocity could be generated.

Such systems have been widely utilized in the past; however, they are subject to a number of well known disadvantages. For example, systems of this type have extremely poor low frequency response, especially as the frequency of vibration approaches zero. Furthermore, such systems are generally characterized by extremely low output signal level, whereby considerable amplification is necessary. This increases the cost and complexity of the system, as well as its susceptibility to noise.

A further significant difficulty with such systems is the necessity for the transducer to be in contact with the vibrating member. In many instances, this so increases the mass of the vibrating system as to substantially alter the natural pattern of vibration, making it impossible to accurately determine the vibration of the member itself.

One of the most promising modes of overcoming the above-described difficulties has been the use of so-called noncontacting vibration transducers. However, since known noncontacting pickups are extremely sensitive to the environment in which they operate, including variations in ambient temperature and standoff distance from the vibrating member, considerable difficulty has been encountered in rendering such devices commercially feasible. However, upon the discovery of the techniques taught in assignee's U.S. Pat. No. 3,180,136, entitled "Continuously Calibrated Displacement Measuring Transducer System," it became possible to produce a noncontacting vibration analyzer, having great commercial utility.

In accordance with the teachings of the above-identified patent, a number of commercially suitable embodiments are now available. These include systems utilizing the Hall-effect, i.e. the phenomenon that a material conducting a current and subject to a magnetic field in a direction perpendicular to the current will develop a voltage across itself in a direction mutually perpendicular to the current and the magnetic field. Other embodiments include variable capacitance-type devices. The success of these systems is due in large part to the calibration technique taught in the aforementioned patent. In this, the non-contacting sensor is continuously varied between limits at a known frequency and amplitude, which known variation is used as a standard against which to accurately measure the levels of vibration in the machine or member under investigation.

As previously indicated, systems of these types possess great utility, and enjoy considerable acceptance in the field of vabration analysis. However, under certain circumstances, the systems present problems. For example, it is often necessary to measure the vibration of a bearing for a high speed rotating shaft. In many instances, the point at which such measurement should be made is completely enclosed, e.g. in order to provide lubrication for the bearing. While it would be theoretically possible to insert a non-contacting vibration probe such as shown in the above-noted patent, directly into the machine housing, a number of practical problems exist. For example, in the case of the capacitive-type pickups, the movement of oil or other lubricant within the machine housing would have a considerable effect on the electric fields between the probe and the vibrating member, thereby rendering accurate measurement of the vibrations substantially impossible. While such effects would not exist with the Hall-effect type probe, its use is limited to the measurement of vibration in magnetizable members. Similarly, in the case of monitoring of various chemical processes, variations in dielectric properties of the material between the probe and the member whose vibration is to be monitored, or the construction of such member of a non-ferrous metal, would substantially limit the utility of present non-contact transducing techniques.

According to the present invention it has now been found possible to provide a non-contacting vibration measurement system which may be inserted directly into the housing of a rotating machine, or other enclosed area to obtain vibration measurements independent of variations in the dielectric properties in the space between the probe and the vibrating member, and without regard to the nature of the vibrating member (as long as the latter is electrically conductive). Vibration measurement apparatus in accordance with this invention is fully compensated for changes in distance between the probe and the vibrating member, temperature changes within the housing, and other environmental changes to a degree substantially exceeding that heretofore available.

In accordance with the present invention, the vibration measuring system includes a variable impedance non-contacting probe of novel construction, adapted to induce modulation of a high frequency signal in accordance with variations in the displacement between the probe and the member being monitored. In addition to such modulation, a standardized calibrating vibration is induced in the probe itself. Departures from the expected calibration induced modulation due to environmental changes are employed to calibrate the system effectively to eliminate the effects of such environmental variations in the actual measured signal. This technique is quite similar to that employed in assignee's aforementioned U.S. Pat. No. 3,180,136.

In one particular embodiment, the vibration sensing element itself comprises a variable impedance element adapted to be vibrated axially by a piezoelectric driver at a known calibration frequency. Impedance variations are caused by the combined effects of eddy currents induced in the vibrating member due to the signal current flowing through the probe and by variations in the reluctance of the magnetic circuit comprised of the probe and the vibrating member. Depending upon the precise construction of the probe, one or the other of the above effects may be made to predominate if desired. The impedance variation may be employed either to vary the frequency of the signal current, (frequency modulation), or simply to vary the amplitude of the signal current, (i.e. amplitude modulation).

In either instance, the effects of the vibration of the monitored member and the standardized axial vibration of the probe both combine to vary the probe impedance and to provide a means for accurately calibrating the system.

An additional feature of this invention resides in the manner in which all components of the signal current modulation attributable to probe vibration are eliminated. As may be understood, unless suitable precautions are taken, signal components at the calibration frequency may introduce certain inaccuracies in the vibration measurement. One approach to this problem would be to establish a vibration frequency for calibration substantially beyond the limit of the frequencies to be measured by the instrument. Such an approach is not entirely satisfactory because of possible mechanical limitations of the system and because of the desire to provide a wide response bandwidth for the instrument.

On the other hand, if the calibration frequency is within the response band-width of the instrument, extremely narrow-band filtration may be necessary to eliminate effects of the calibration frequency from the modulated signal current, without also eliminating components of the vibration to be measured. Suitable narrow band filters at the frequencies of interest, e.g. less than one thousand cycles per second, are often quite costly, and otherwise undesirable in systems of the present type. Thus, according to this invention, there is provided a differential amplifier filter system of great efficiency and simple construction whereby the calibration frequency component may be substantially eliminated from the signal current without also eliminating a large number of significant vibration components.

Accordingly, it is a primary object of this invention to provide an improved vibration monitoring apparatus.

It is a further object of this invention to provide an improved non-contacting vibration monitor or sensing system.

It is also an object of this invention to provide a non-contacting vibration monitor capable of accurate measurement of vibration even if subject to the presence of fluid flowing around the vibration pickup.

It is a further object of this invention to provide a non-contacting vibration monitor suitable for use with vibrating members constructed of non-ferrous metal.

It is a further object of this invention to provide a non-contacting vibration monitor which is continuously calibrated to provide extreme accuracy independent of variations in environmental conditions.

It is an additional object of this invention to provide a non-contacting vibration monitor which remains accurate notwithstanding variations in the properties of the space between the vibrating member and the monitor.

It is an additional object of this invention to provide a non-contacting vibration monitor as described above which is continuously calibrated by imparting thereto a continuous vibration of known frequency and amplitude, the effect of which is used to adjust the characteristics of a measurement circuit to eliminate all variations due to environmental changes such as temperature variations, changes in stand-off distance and the like.

It is also an object of this invention to provide a non-contacting vibration monitor as described above including novel means to substantially eliminate from the vibration measurement itself, all effects due to vibration at the calibration frequency.

It is further an object of this invention to provide a non-contacting monitor vibration having a pickup including a coil adapted to be placed close to but not in contact with the vibrating object and having means to generate a signal which passes through the coil, the coil being adapted to modulate the signal in response to variations in the distance between the coil and the object.

It is an additional object of this invention to provide a non-contacting monitor vibration having a coil adapted to be placed close to but not in contact with the vibrating object so that the impedance of the coil is a function of the distance between the coil and the object and including means to provide a signal to the coil, which signal is modulated in accordance with the distance between the object and the coil.

It is also an object of this invention to provide vibration monitoring apparatus comprising sensing means having a pickup and means to generate a pickup signal including a first component independent of the monitored vibration and further components which vary in accordance with the distance between the pickup and the vibrating object, and including means to vibrate the pickup in a known manner to provide one of the further components of the signal, a variable sensitivity amplifier, the sensitivity of which is adjusted in accordance with the signal component attributable to the known vibration, output circuitry and means to eliminate from the output components attributable to the known vibration, and further including logic means for generating a first indication if the signal component independent of the vibration falls below a predetermined level, and a further indication if the signal component attributable to the known vibration departs from between upper and lower limits.

The exact nature of this invention as well as other objects and advantages thereof will be apparent from consideration of the following detailed description and claims and the accompanying drawing wherein:

FIG. 4 is an overall electronic block diagram of the vibration monitor according to this invention.

Figure 1:
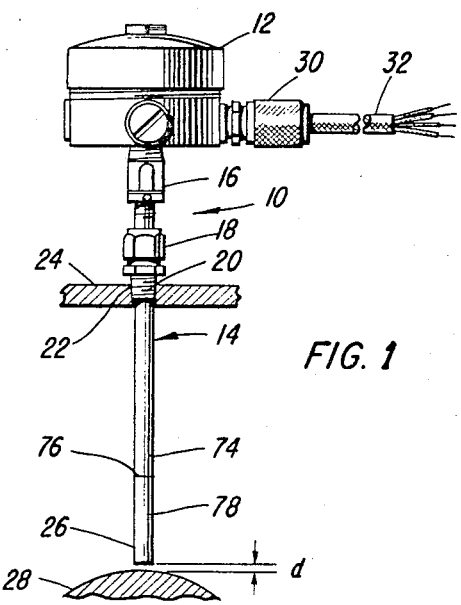
FIG. 1 is a side elevation showing in a general manner, the external features of one suitable embodiment of the non-contacting vibration probe of the present invention.

Referring first to FIG. 1, the probe unit according to this invention, generally denoted at 10, comprises an upper housing 12 containing the calibration frequency driver and a probe shaft 14 comprised of an elongated tube which houses the vibration pickup itself. Probe shaft 14 is attached to housing 12 by a suitable coupling member 16 to form the assembled unit.

As previously indicated, one of the principal features of the present invention is that it may be used within the housing of the machine or member whose vibration is to be monitored. To this end probe shaft 14 is fitted with a pipe coupling 18 having a threaded nipple 20 adapted to be fitted within a complimentary threaded aperture 22 in a machine housing, a portion of which is shown at 24 in FIG. 1. By appropriate adjustment of the location of pipe coupling 18 along shaft 14, the stand-off distance $d$ between the end 26 of probe shaft 14 and the vibrating member, indicated generally at 28, may be adjusted.

As will be explained below, the exact distance is not critical since the continuous calibration technique eliminates the effect of variations in the stand-off distance on the vibration measurement. However, in order to assure most accurate operation notwithstanding other environmental changes, it is found that the end of the probe shaft should be located a distance of 0.10 inch or less from the vibrating member. Of course, as will be realized, should the vibration monitor be used in an environment where vibration amplitudes on the order of this distance is expected, then the electrical parameters of the calibration circuitry may be suitable adjusted to accommodate a greater stand-off distance.

Housing 12 contains the calibration driver described below and is preferably of sufficient size to house various portions of the electronic circuitry, including a signal current generator also described below. The signal current is amplitude modulated by variations in the distance between probe tip 26 and the vibrating member 28 (due to the calibrating vibration as well as to the vibration to be monitored) and provides the output signal for use by the remainder of the system. A suitable connector 30 is attached to the side of housing 12 to facilitate the connection of a cable 32 between the electronic circuitry in the housing and the remainder of the system.

Figure 2:
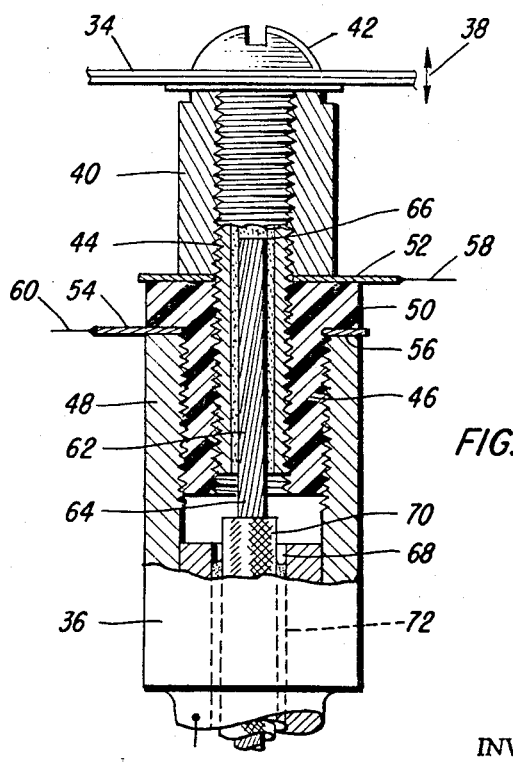
FIG. 2 is a longitudinal view, partially cut-away, and partially in section, showing a number of internal features of a portion of a probe constructed according to the present invention, including the basic features of the continuous calibration mechanism.

Shown in FIG. 2 are details of one embodiment of a calibration driver mechanism suitable for use in the present invention.

The calibration driver itself comprises a Bimorph crystal shaker 34 mounted within housing 12 and is arranged to axially vibrate an attached aluminum drive shaft 36. Bimorph crystal 34 is a piezoelectric vibrator similar to that shown in assignee's co-pending U.S. patent application, Ser. No. 333,335, filed Dec. 26, 1963, and entitled "Non-Contacting Displacement Gauge," now Pat. No. 3,379,973.

As explained in the aforementioned patent application, the crystal driver unit comprises a pair of piezoelectric plates separated by a metallic spacer. Conductive electrodes are attached in any suitable manner to the outer surfaces of the piezoelectric layers. The above-described assembly is rigidly supported at its periphery within housing 12 so that under the influence of an oscillating electrical signal applied to the two piezoelectric plates, vibration as indicated by the two-headed arrow 38 in FIG. 2 will result.

Bimorph crystal 34 is of annular configuration and is attached to an internally threaded aluminum extension shaft 40 by means of a nylon or other non-conducting screw 42. Extension shaft 40 connects crystal driver 34 to drive shaft 36 by means of an externally threaded metallic shaft connector 44 which engages with extension shaft 40 and with an internally threaded sleeve 46 threadedly attached to the end 48 of drive shaft 36.

Sleeve 46 is comprised of nylon or other insulating material and has an expanded portion 50 to separate a pair of conductive springs 52 and 54 by which current is provided to the vibration pickup. Upper spring 52 rests against the top of sleeve 46 and is held in place by extension shaft 40 when the latter is attached to shaft connector 44. The lower contact spring 54 rests on the upper surface 56 of drive shaft 36 and is firmly supported when the latter is attached to sleeve 46. The outer ends of contact springs 52 and 54 (not shown) are rigidly mounted within housing 12 and as indicated schematically by wires 58 and 60, are connected in the electrical circuit of the signal current generator described below.

As shown in FIG. 2, an electrical path exists between upper contact spring 52 and shaft connector 44 through the aluminum extension shaft 40, while an independent electrical path exists between lower contact spring 54 and drive shaft 36. Due to the presence of nylon sleeve 50, the two electrical paths are completely isolated from each other.

Shaft connector 44 contains an axial passage 62 and receives a wire 64. The latter makes electrical contact with the connector 44 by way of a soldered joint 66. Wire 64 extends downwardly through an aligned axial passage 68 in drive shaft 36, but is electrically isolated from it by an insulating jacket 70. The space between the inner wall 72 of drive shaft 36 and insulated wire 64 is filled with epoxy or like resin to provide rigid support for the wire as it extends downward through the drive shaft.

As shown in FIG. 1, the entire assembly described above is mounted within a hollow protective tube 74, which terminates at 76 and is attached to a probe cap 78 to protect the vibration pickup itself.

Figure 3:
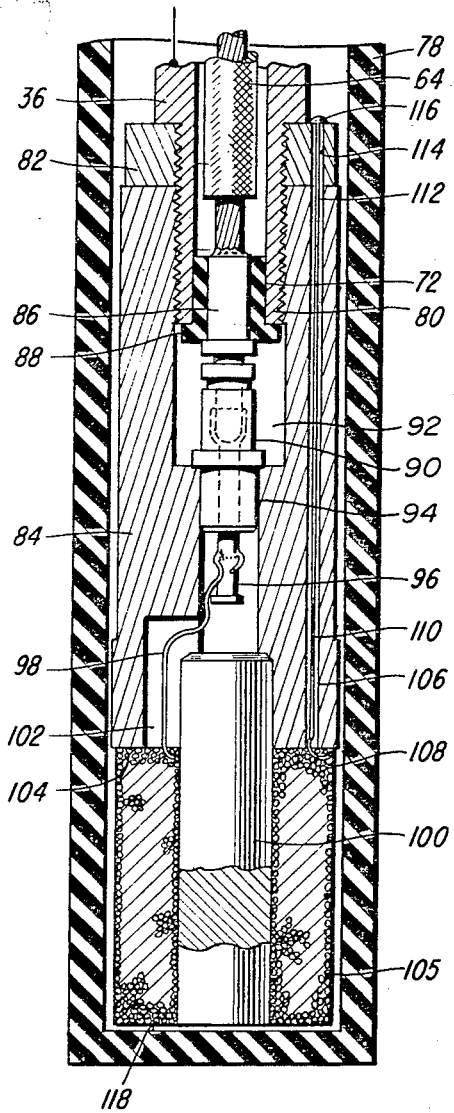
FIG. 3 is a longitudinal sectional view of the lower portion of the vibration pickup itself.

The details of the pickup are shown in FIG. 3. Drive shaft 36 extends downward into probe cap 78 and terminates in an elongated threaded portion 80 reduced in diameter from that of the shaft above. Secured to shaft end 80 is a metallic ring 82 and a coil spool 84 comprised of insulating material. Wire 64 extends downward to the end of tube 36 where it is attached to a suitable pin plug 86 spaced from the tube wall 72 by an insulating spacer 88. Plug 86 is connected to a complimentary jack 90 located in a cavity 92 in the coil spool 84. Cavity 92 is reduced in diameter at 94 to rigidly support jack 90 in place. Jack 90 terminates in a suitable soldering lug 96 to which is attached one end of a wire 98 which serves as one terminal of the vibration pickup 105. An iron core 100 is cemented in place by epoxy or like resin in a lower cavity 102 in coil spool 84 and serves in a magnetic circuit with a plurality of turns 104 of wire 98 which form the coil 105.

An axial passage 106 radially displaced from the center of coil spool 84 extends upwardly therethrough and serves as a channel for the other end 108 of the pickup wire 98 of coil 105. The latter may itself extend through passage 106, or, as shown, preferably is soldered to a length of insulated wire 110 which is rigidly supported in longitudinal passage 106 by epoxy or other similar resin. The upper end 112 of wire 110 is bare, and extends through to a passage 114 in metal ring 82 aligned with longitudinal passage 106. The wire is attached to ring 82 as by soldering at 116 to provide an electrical path from the pickup coil 105, to drive shaft 36, and then to lower contact spring 54. A conductive path for the other end of wire 98 is provided by jack 90, plug 86, central wire 64, and shaft connector 44 to upper contact spring 58.

Pickup coil 105 serves as a variable impedance element as described in detail below, to amplitude modulate the output of a signal generator in accordance with the distance from the probe to the vibrating member. The impedance is affected by eddy current generated in the vibrating member as a result of the signal current flowing through windings 104 of coil 105 (the current retarding effect of which depends on the distance between the vibrating member and the coil). In addition, due to the presence of iron core 100, the coil serves as a variable reluctance pickup. The impedance variations seen at contact springs 52 and 54 will depend upon both the eddy current and variable reluctance effects although coil 105 may be air wound, in which case, the impedance variations will be substantially due to eddy current effects only. As will be understood, the variable reluctance effects will not be of great significance in the monitoring of non-ferrous metal objects. However, inclusion of the core 100 does add to the versatility of the system, and is primarily intended for use in those situations wherein the object being sensed is ferrous.

In one suitable embodiment of the invention, core 100 preferably comprises a soft iron slug of cylindrical configuration, approximately 0.665 inch long, and approximately 0.156 inch in diameter. Coil 105 preferably includes approximately 800 turns of 34 gauge wire, the entire coil being approximately 0.56 inch long and approximately 0.375 inch in diameter. The overall length of the probe assembly 10 is sufficient to accommodate the device being monitored, for example 10–15 inches.

The above-described assembly is encased within probe cap 78 as shown in FIG. 3. Since crystal driver 34 imparts axial motion to the pickup. The lower end of the probe should not be in contact with inner surface 118 of probe cap 78. Thus, when the device is assembled, clearance must be provided so that the probe may be freely driven. In practice, it is found that most satisfactory results are achieved if the clearance is between 0.01 and 0.015 inch.

The electrical system used with the above-described vibration pickup according to the invention is shown in FIG. 4. In the particular embodiment shown it is arranged either to operate in the continuous calibration mode previously described or in a manual calibration mode, should this be desired. In FIG. 4, the member whose vibration is being monitored is illustrated as a rotating shaft 28. The lower end of probe assembly 10 (see FIG. 1) is shown slightly displaced from the rotating shaft. One end of pickup coil 105, e.g. that connected to lead 64 shown in FIGS. 2 and 3, is fed by the output of a signal current oscillator 120, while the other end is connected as by wire 110, crystal drive shaft 36 and lower contact spring 54 in FIGS. 2 and 3, to a voltage divider resistor 122 at the input of a pre-amplifier detector 124 described below. Crystal driver 34 shown schematically in FIG. 4 is driven by a calibration oscillator 126 and driver amplifier 128 through a suitable transformer 130. Calibration oscillator 126 is connected through a two-position switch 132 to a source of D.C. power at 134. The position of switch 132 shown corresponds to the so-called continuous calibration mode of operation. The other position of switch 132 is connected through push button switch 136 to the source of D.C. power at 134 and serves as explained below when the system is operating in the manual calibration mode to selectively energize calibration oscillator 126 in order to vibrate the crystal driver 34.

As previously mentioned, in accordance with this invention it is desirable that the calibration frequency be localized within the response band of the system in order to permit a maximum range of operation. On the other hand, the frequency of the signal current generated by oscillator 120 is preferably substantially above the expected range of vibration frequencies. In one practical embodiment, the frequency of operation of calibration oscillator 126 is preferably approximately 240 cycles per second while the frequency of signal current oscillator 120 is preferably approximately 100,000 cycles per second, or 100 kc.

Pre-amplifier/detector 124 includes any suitable amplifier to provide a signal of sufficient amplitude for use by the remainder of the system. It includes an amplitude modulation detector of conventional design. The demodulated signal is provided over lead 138 as the input to a high pass filter 140 which limits the low frequency response of the system. This filter may be removed if the low frequency cutoff is not desired. In any event, the output of detector 124 is comprised of a plurality of frequency components corresponding to the calibration frequency and to the various frequencies present in the vibration of rotating shaft 28, the amplitude of each component being a function of the vibration component at that frequency.

Filter 140 feeds a calibrated amplifier 142, which feeds a calibration signal generator 144 through a bandpass filter 146. Calibrated amplifier 142 is a wide band amplifier and is connected to a feed back network including a two position switch 148 connectable to an automatic gain control (AGC) circuit 150, or a variable resistor 152. The automatic gain control circuit is connected in the feed back path of calibrated amplifier 142 when switch 132, which is mechanically coupled to switch 148, is in the position corresponding to the continuous calibration mode of operation. When switches 132 and 148 are in the manual calibration position, variable resistor 152 serves as the feed back network for amplifier 142.

Band pass filter 146 connected at the output of the calibrated amplifier 142 is a sharply tuned filter having its pass band centered around the frequency generated by calibration oscillator 126, whereby only components of the signal on lead 138 corresponding to calibration vibration are fed to calibration signal generator 144. The latter may comprise, in its simplest form, a rectifier network which provides an output signal proportional to the amplitude of the output of band pass filter 146.

AGC circuit 150 is operated by the output of calibration signal generator 144 and comprises any suitable signal controlled impedance. As will be understood, AGC circuit 150 or variable resistor 152 represents the feed back impedance connected across calibrated amplifier 142 thereby permitting variation of the effective gain.

The output of calibrated amplifier 142 is connected as a first input 153 to a differential amplifier 154, the second input to which is provided by a lead 156 from the output of band pass filter 146. The signal appearing at the output of differential amplifier 154, is substantially free of components at the calibration frequency due to the fairly selective nature of band pass filter 146. However, in order to provide an even greater assurance that the signal which represents the vibration of rotating shaft 28, is in fact free of all components attributable to the axial calibration vibration, a portion of the output of band pass filter 146 is subtracted by amplifier 154 from the signal on lead 153 to substantially eliminate all components within the pass band of filter 146.

The system output provided on lead 158 by a differential amplifier 154 is representative of the actual vibration components due to motion of the rotating shaft 28 relative to the vibration pickup 10. As may be understood, the signal appearing on lead 158 may be analyzed by conventional techniques of harmonic analysis to determine precisely the frequencies of vibration of the monitored member. In addition, the output of differential amplifier 154 is connected through an average detector 160 to provide a D.C. signal representative of the dominant mode of the vibration being monitored. The output of average detector 160 is connected through a pushbutton switch 160 to a meter 164 to provide a visual indication of the average of vibration level. Pushbutton switch 162 is mechanically coupled to pushbutton 136, previously described, so that when the latter is depressed, meter 164 is disconnected from the output of average detector 160, and connected instead to the output of calibration signal generator 144 to facilitate manual calibration as described below.

To fully understand the operation of the apparatus described above, it should be recalled that the axial displacement of vibration probe 10 due to the operation of crystal driver 34, causes a displacement between the pickup coil 105 and rotating shaft 28. In addition, vibration of shaft 28 itself causes an additional variation in the distance between the pickup and the shaft. The combined effect of these motions causes a variation in the impedance of pickup coil 105. The impedance variation in turn causes amplitude modulation of the 100 kilocycle per second signal current generated by oscillator 120 in accordance with the combined effect of the two displacements. Thus, a varying voltage will be developed across input resistor 122 connected to pre-amplifier/detector 124.

The amplitude modulation appearing at the input of detector 124 is caused only by relative movement, and is representative of all vibration present; environmental changes affect shaft vibration induced components to substantially the same degree that they affect the component due to axial calibration displacement.

Calibration oscillator 126 and driver amplifier 128 are adapted to provide crystal driver 34 with an input signal of precisely controlled amplitude and frequency. Thus, a known continuous vibration at the calibration frequency is always present, and will cause a continuous 240 cycles per second component in the output of amplifier 142. To assure continuous calibration, AGC circuit 150 need only adjust the overall gain of amplifier 142 to maintain the signal at calibration frequency at a level corresponding to the known axial vibration. This is readily accomplished by proper adjustment of calibration signal generator 144. Then, since environmental effects at the calibration frequency are about the same as at other frequencies, the output of amplifier 142 at each frequency will properly represent the vibration level at that frequency.

When operation in the manual calibration mode is desired, switches 132 and 148 are reversed. This connects calibration oscillator 126 to switch 136 for intermittent operation, and substitutes the manually controlled variable resistor 152 for the signal controlled AGC network 150. Thus, when push button switch 136 is depressed, calibration oscillator 126 is energized as before and the value of feedback resistor 152 is adjusted so that the signal at the calibration frequency will represent the proper known level of vibration. Since switches 136 and 162 are mechanically coupled, when the calibration oscillator is energized in the manual mode, meter 164 is connected to the output of calibration signal generator 144 to indicate the vibration level at the frequency passed by filter 146. As may be understood, feedback resistor 152 is adjusted until the reading on the meter corresponds to the actual vibration known to be present due to the crystal driver 38.

The system includes a number of additional safety features not heretofore mentioned. For example, the demodulation portion of preamplifier/detector 124 may be adapted to provide a carrier output on lead 166. This is connected to a logic circuit 168 which includes level detection circuitry responsive to the carrier frequency to generate a logic signal on lead 170 if the carrier is not present. This signal may be connected to a suitable alarm circuit to provide an indication that the vibration monitor has become inoperative. This prevents the operator from relying on what may in reality be a false indication of the level of vibration of the rotating shaft 28.

A second input to logic circuit 168 is provided from the output of calibration signal generator 144, to additional level sensing circuitry which responds to excessively high or low calibration signals to provide a second alarm indication over lead 172. The alarm level of the latter signal is adjusted to provide an indication whenever a variation of the characteristics of AGC circuit 150 is required that exceeds that possible for the circuit. Thus, should environmental or other changes require so great an adjustment in the gain of calibrated amplifier 142 that AGC circuit 150 is incapable of meeting the requirement, then the indication provided over lead 172 provides a warning that the vibration output signal may not be accurate.

Thus, there is provided vibration monitoring apparatus useful in many environments previously inaccessable to vibration measurement. Since the apparent impedance of pickup coil 105 depends in part on eddy effects, environmental variations such as changes in the electro-magnetic properties of the space between the tip of the vibration pickup and the vibrating member may be compensated for. Moreover, requirement that the vibrating member itself be comprised of a ferrous metal is eliminated. In other words, all that is necessary is that the eddy currents be supportable in the material, which would of course be the case in any conductor. As the system operates, there is continuous compensation for temperature and other variations. In addition, once the probe is attached to the housing of the member whose vibration is being monitored the system is fully calibrated to the precise standoff distance without the necessity of adjusting the same with any great accuracy.

As may be understood, considerable variation in the system as described above may be expected within the scope of this invention. For example, the mechanical features described in connection with FIGS. 1–3, especially the construction and mounting of bimorph crystal driver assembly 34, may be accomplished in other arrangements which will be apparent to those skilled in the art. Similarly, the assembly of pickup coil 105 and its connection to the drive shaft may be modified within the teaching of the invention.

In like manner, the electronic system shown in FIG. 4 is intended to be exemplary. For example, the impedance variations in coil 105 may frequency modulate the output of oscillator 120. In this event, corresponding modification detector 124 would also be necessary. In addition, the system need not be arranged to permit the manual calibration feature described, but rather may simply be constructed to operate at all times in the continuous calibration mode. Alternatively, there may be added to or substituted for one of the described modes of operation, a periodic calibration mode wherein calibration oscillator 126 is periodically energized for a short time to permit adjustment of system calibration if necessary. Of course, other electronic modifications will be evident to one skilled in the art in light of the above disclosure.

Thus, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for monitoring a vibrating electrically conducting object comprising: a pickup including a coil adapted to be placed in spaced proximity to the object; electro-mechanical calibrating means to impart known vibration to the coil relative to the object; an oscillator connected to the coil to generate a signal; the coil serving as a variable impedance to modulate the signal in accordance with the instantenous distance between the coil and the object; and measurement circuitry connected to the coil to convert the modulated signal into a measurement of the vibration being monitored; said pickup further comprising mounting means for said coil; first and second conductor means extending through said coil mounting means and forming electrical signal paths for the first and second ends of said coil; a support structure for connecting said coil mounting means to said calibrating means; said support structure including a passage for receiving said first conductor means; an electrically conductive portion connected to said conductor means forming part of the electrical signal path for the second end of said coil, and electrical insulating means for preventing electrical coupling between said first conductor means and the electrically conductive portion of said support structure; first electrical terminal means connected to said first conductor means; second electrical terminal means connected to said conductive portion of said support structure; and means connected to said first and second electrical terminal means coupling said pickup to said oscillator.

2. Apparatus as set forth in claim 1 where the pickup includes a core portion comprised of magnetizable material, said core being disposed within the coil, the instantaneous impedance of said coil depending in part on loading caused by eddy currents induced in the object by the signal flowing through the coil, and in part by variations in the reluctance of the magnetic circuit including the magnetizable core and the object being monitored.

3. Apparatus as defined in claim 1 wherein said measurement circuitry includes means responsive to a portion of said modulated signal attributable to said known vibration of said coil for adjusting the response of said measurement circuitry to said known vibration to maintain said response at a predetermined level, and readout means to provide an output measurement of the portions of the modulated signal not attributable to said known vibration.

4. The apparatus of claim 1, wherein the electro mechanical calibration means comprises a bimorph crystal, means coupling the crystal to the coil, and a second oscillator adapted to drive the crystal at a predetermined frequency and amplitude to vary the instantaneous distance between the coil and the object being monitored.

5. The apparatus as set forth in claim 4, including means to continuously energize the second oscillator.

6. The apparatus as set forth in claim 4, including means to selectably energize the second oscillator.

7. The apparatus as set forth in claim 4, where the measurement circuitry includes demodulator means to provide the modulation components of the signal at a first output, and the unmodulated signal at a second output, variable sensitivity amplifier means connected to the first demodulator output, filter means to separate the modulation component attributable to the calibrating vibration from the output of the variable sensitivity amplifier, means connected to the variable sensitivity amplifier, to vary the sensitivity thereof in accordance with the level of such component, means connected to the variable sensitivity amplifier and to the filter means to subtract the output of the latter from the output of the former, and means to provide an indication of the level of the output of the last named amplifier.

8. The apparatus as set forth in claim 7, further including logic means connected to the second demodulator output to produce an indication when the unmodulated signal falls below a certain level.

9. The apparatus as set forth in claim 7, further including logic means adapted to produce a first indication when the modulation component of the signal caused by the calibrating vibration departs from between predetermined upper and lower limits.

10. The apparatus as set forth in claim 9, wherein the logic means is also connected to the second demodulator output and is responsive to the level of the unmodulated signal to produce a further indication when the latter falls below a predetermined level.

11. Apparatus for monitoring vibration of an electrically conductive object comprising sensing means including a pickup adapted to be placed in spaced proximity to the vibrating object, the sensing means producing a signal including a first component independent of the monitored vibration, and additional components, the level of which vary in accordance with the monitored vibration, calibration means for vibrating the pickup to add a further component to the signal, the level of which component varies in accordance with such known vibration, and electronic means connected to the pickup including first circuit means to separate the first component from the additional components and the further component, second circuit means substantially to separate the further component from the additional components, variable sensitivity amplifier means, means to adjust the sensitivity in accordance with the level of the separated further component, and output circuitry connected to the amplifier means and to the second circuit means to add the separated further component in phase opposition with the additional components.

12. The apparatus as set forth in claim 11, including logic means connected to the first circuit means to produce an indication when the first component of the signal falls below a certain level.

13. The apparatus as set forth in claim 11, including logic means adapted to produce a first indication when the level of the further component of the signal departs from between predetermined upper and lower limits.

14. The apparatus as set forth in claim 13, wherein the logic means is also responsive to the output of the first circuit means to generate a further indication when the first component of the signal falls below a predetermined level.

15. The apparatus as set forth in claim 11, where the sensing means further includes an oscillator connected to the pick-up to generate the signal, variable impedance means in the pick-up connected to the oscillator to modulate the signal in accordance with the instantaneous distance between the vibrating object and the pick-up, whereby the first component comprises the unmodulated signal, and the additional components and further component comprise the modulation components of the signal, and where the first circuit means includes demodulating means for providing the modulation components of the signal in a first output circuit, and the unmodulated signal in a second output circuit.

16. The apparatus as set forth in claim 15, including logic means connected to the second output circuit to produce as indication when the unmodulated signal falls below a certain level.

17. The apparatus as set forth in claim 15, where the variable impedance comprises a load circuit to amplitude modulate the output of the oscillator.

18. The apparatus as set forth in claim 15, where the variable impedance comprises a frequency control element for frequency modulating the output of the oscillator.

19. The apparatus of claim 15, where the second circuit means comprises a band pass filter tuned to the frequency of the known vibration induced by the calibration means, and where the output circuitry includes a differential amplifier adapted to subtract the filter output from the output of the variable sensitivity amplifier to provide a measurement signal substantially free of components attributable to the calibration vibration.

20. The apparatus as set forth in claim 15, where the variable impedance comprises a coil disposed in spaced proximity to the vibrating object.

21. Apparatus as defined in claim 11, wherein said pickup comprises a coil; mounting means for said coil; first and second conductor means extending through said coil mounting means and forming an electrical signal path for the first and second ends of said coil; a support structure for connecting said coil mounting means to said calibration means; said support structure including a passage for receiving said first conductor means, an electrically conductive portion connected to said second conductor means and forming a part of the electrical signal path for the second end of said coil, and electrical insulating means for preventing electrical coupling between said first conductor means and the electrically conductive portion of said support structure; first electrical terminal means connected to said first conductor means; second electrical terminal means connected to said conductive portion of said support structure; and means connected to said first and second electrical terminals adapted to couple said pickup to said electronic means connected to the pickup.

22. An apparatus for monitoring the vibration of a metallic object comprising a coil adapted to be placed in such close spaced proximity to the object that the impedance of the coil is a function of the distance between the coil and the object, means supplying a signal to the coil, said signal being modulated in response to vibration of the object, means connected to the coil to impart a known vibration thereto for further modulating signal, said pickup further comprising mounting means for said coil; first and second conductor means extending through said coil mounting means and forming electrical signal paths for the first and second ends of said coil; a support structure for connecting said coil mounting means to said means for imparting said known vibration to said coil; said support structure including a passage for receiving said first conductor means; an electrically conductive portion connected to said second conductor means and forming part of the electrical signal path for the second end of said coil, and electrical insulating means for preventing electrical coupling between said first conductor means and the electrically conductive portion of said support structure; first electrical terminal means connected to said first conductor means; second electrical terminal means connected to said conductive portion of said support structure; and means connected to said first and second electrical terminals to couple said coil to said means for supplying said signal to said coil.

23. An apparatus as set forth in claim 22 where the means to impart the known vibration to the coil comprises an elongated member one end of which is attached to the coil, electromechanical vibrating means connected to the other end of the elongated member, and further circuit means to drive the vibrating means at a known frequency and amplitude.

24. An apparatus as set forth in claim 23 where the electromechanical vibrating means comprises a bimorph crystal electrically connected to the further circuit means and mechanically connected to the elongated member.

25. A non-contact vibration pickup comprising a coil adapted to be placed in such spaced proximity to an electrically conducting vibrating object under inspection that the impedance of the coil is a function of the distance between the coil and the object; an electro-mechanical oscillator for imparting a known vibration to said coil; mounting means for said coil; first and second conductor means extending through said coil mounting means and forming electrical signal paths for the first and second ends of said coil; a support structure for connecting said coil mounting means to said electro-mechanical oscillator; said support structure including a passage for receiving said first conductor means, and electrically conductive portion connected to said second conductor means and forming part of the electrical signal path for the second end of said coil, and insulating means for preventing electrical coupling between said first conductor means and the electrically conductive portion of said support structure; first electrical terminal means connected to said first conductor means; second electrical terminal means connected to said conductive portion of said support structure; and means connected to said first and second electrical terminals adapted to couple said pickup to external electrical signal processing means.

26. Apparatus as defined in claim 25 wherein said pickup includes a core portion comprised of magnetizable material secured to said coil mounting means and being disposed within said coil, the instantaneous impedance of said coil depending in part on loading caused by eddy currents induced in the object by a signal flowing through the coil, and in part by variations in the reluctance of the magnetic circuit including the magnetizable core and the object being observed.

References Cited

UNITED STATES PATENTS

| | | | |
|---|---|---|---|
| 2,985,823 | 5/1961 | Wright | 73—71.4 XR |
| 3,180,136 | 4/1965 | Foster | 73—71.4 |
| 3,379,972 | 4/1968 | Foster et al. | 73—71.4 XR |

OTHER REFERENCES

Yates, W. A., et al., "Wide-Range Calibrator for Vibration Pickups," Electronics, Sept. 1953, pp. 183–185.

CHARLES A. RUEHL, Primary Examiner

U.S. Cl. X.R.

324—61